E. A. LUSTER.
MEASURING AND CALCULATING MACHINE.
APPLICATION FILED FEB. 16, 1910.

1,016,078.

Patented Jan. 30, 1912.
2 SHEETS—SHEET 1.

E. A. LUSTER.
MEASURING AND CALCULATING MACHINE.
APPLICATION FILED FEB. 16, 1910.

1,016,078.

Patented Jan. 30, 1912.

2 SHEETS—SHEET 2.

Witnesses

Inventor
Eugene A. Luster.
By
Attorneys

UNITED STATES PATENT OFFICE.

EUGENE A. LUSTER, OF ATHENS, GEORGIA, ASSIGNOR OF ONE-THIRD TO NORA LUSTER EPTING AND ONE-THIRD TO ALFRED T. CONWAY, OF ATHENS, GEORGIA.

MEASURING AND CALCULATING MACHINE.

1,016,078.   Specification of Letters Patent.   Patented Jan. 30, 1912.

Application filed February 16, 1910. Serial No. 544,260.

*To all whom it may concern:*

Be it known that I, EUGENE A. LUSTER, a citizen of the United States, residing at Athens, in the county of Clarke and State of Georgia, have invented a new and useful Measuring and Calculating Machine, of which the following is a specification.

This invention has reference to improvements in machines designed for indicating measurements of material and the total price of the desired quantity at a determined price per unit, the object of the invention being to save mental effort on the part of the operator and liability of mistakes in calculation.

In accordance with the present invention there is provided means for indicating linear or other measurements responsive to the movement of the material being measured and at the same time provision is made for indicating the price of the total quantity of goods measured at the predetermined price per unit of measurement.

Figure 1:
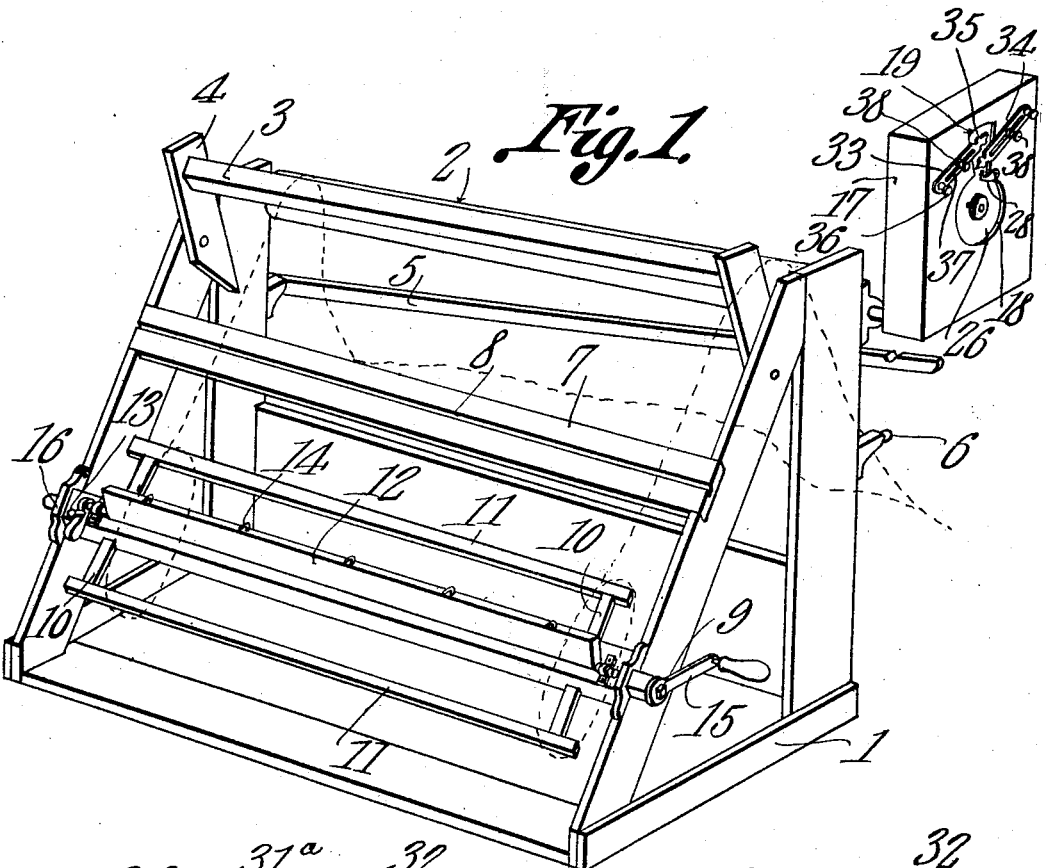
Figure 2:
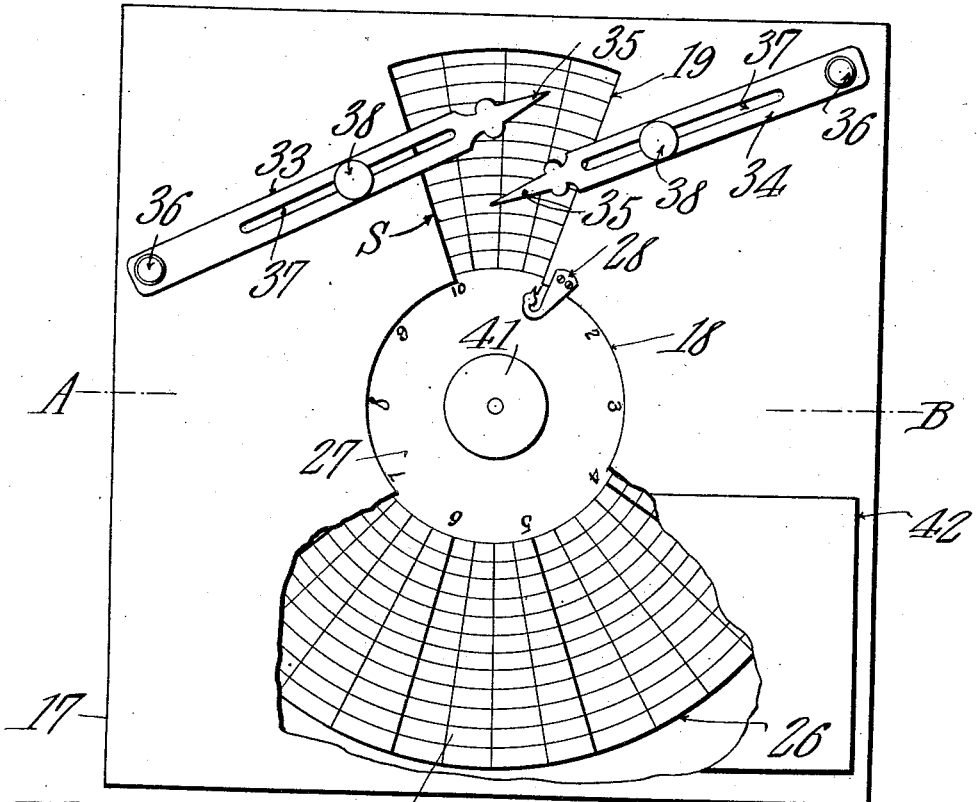
Figure 3:
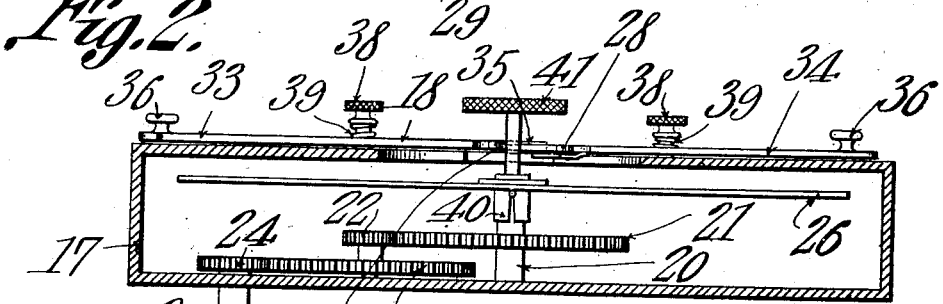

The invention will be best understood from a consideration of the following detail description taken in connection with the accompanying drawings forming a part of this specification, in which drawings, Figure 1 is a perspective view of a reel with the measuring mechanism slightly separated therefrom to disclose parts which would otherwise be hidden. Fig. 2 is a face view of the measuring mechanism with parts broken away. Fig. 3 is a cross section on the line A—B of Fig. 2 with some parts shown in elevation. Figs. 4 and 5 show portions of index cards which may be used in connection with the measuring side of the machine.

Referring to the drawings there is shown a frame 1 either constructed as illustrated or which may be otherwise constructed to constitute a support for parts to be described.

The frame 1 is provided with journal bearings for a roller 2 adjacent to and in operative relation with which there is provided a presser bar 3 carried at the ends by pivoted arms 4 mounted on the frame 1 so that the bar 3 may be brought into close relation to the roller 2 along its length or may be moved away therefrom at the will of the operator.

On the other side of the roller 2 from that engaged by the bar 3 is a rod or bar 5 pivoted at one end to one side of the frame 1 and at the other end adapted to engage a retaining stud 6 on the opposite side of the frame so that cloth to be measured may be carried from the bolt or from a roll of cloth suitably mounted on journal supports, under and around the rod 5 thence up and over the roller 2 and under the presser bar 3.

Supported on the frame 1 in advance of the roller 2 in the direction of travel of the cloth is another bar 7 fast in the frame 1 and provided with a longitudinal groove or slot 8 about midway of its width. Still further removed from the roller 2 and mounted in the frame 1 is a shaft 9.

The shaft 9 between the side members of the frame 1 carries a reel formed of radial arms 10 near the end of the shaft and these arms are connected by bars 11 longitudinal of the shaft. One of the reel members is replaced by a bar 12 pivoted at the ends to the shaft and projecting under normal conditions radial to the shaft, being held in this position by any suitable latch member indicated at 13. The outer edge of the bar 12 is provided with hooks 14 or other like fastening devices to receive the edge of the cloth to be wound upon the reel supported by the shaft 9. Either one of the bearings of the shaft 9 may be made readily removable so that the corresponding end of the shaft may be disconnected from the frame 1 in order that cloth wound upon the reel may be removed therefrom, the bar 12 being first turned on its pivot support so as to lie against the shaft 9 and thus loosen the cloth wound on the reel. In the drawings the shaft 9 is shown as provided with a manipulating crank 15 and the bearing 16 remote from this crank 15 is the one indicated as removable for the separation of the shaft from the frame at said point. It is of course evident that the other bearing may be made removable instead of the one remote from the crank. It is also evident that the crank 15 is simply indicative of any means of rotating the shaft.

When cloth is drawn over the roller 2, the latter is rotated, the cloth having been first fastened to the bar 12 by the hooks 14 and the cloth may be made to pass over and rotate the roller 2 until the desired amount has been wound on the reel carried by the shaft 9, after which the cloth may be severed by a suitable cutting tool drawn over the cloth coincident with the slot or recess 8 or by a pair of shears guided by said slot or recess.

In order to determine the amount of cloth to be wound upon the reel carried by the shaft 9 without the necessity of measuring the same unit by unit and in order to ascertain the total cost of the amount of cloth measured without calculation, there is provided a measuring and calculating device best shown in Figs. 2 and 3 taken in connection with Figs. 4 and 5.

This measuring device comprises a box or casing 17 of suitable size and preferably entirely closed in except that the cover is formed with a central circular opening 18 and a sector shaped opening 19 extending therefrom and communicating therewith. The opening 18 is central to the box and at the center of the box there is provided a shaft 20 carrying a gear wheel 21 in mesh with a pinion 22 fast to another gear wheel 23 mounted in the box and in turn meshing with a pinion 24 on a shaft 25 which may form part of the shaft of the roller 2 or may be coupled thereto in any suitable manner. The several gear wheels described are to be taken as illustrative only since in the practical embodiment of the machine the proportions of the train of gears are necessarily variable in accordance with the size of the measuring mechanism and of the roller 2. Also the number of gear wheels in the train will vary in accordance with the proportionate movements of the shaft 20 and the roller 2.

Mounted on the shaft 20 is a disk 26 constituting the measure and price indicating disk of the measuring instrument. This disk is provided with a circular zone 27 agreeable to the circular opening 18 in the cover of the box or casing 17. In this circular zone is a circular series of consecutive numbers representing units of measurement, and fast on the cover of the casing is a pointer 28 individual to these particular units.

The remainder of the disk 26 outside the circular zone 27 and comprising an annular zone 29 is divided up into equal spaces which may be separated by heavy lines and between these spaces are lighter radial lines while the zone 29 is further divided up by a series of concentric circles. The heavy division lines are designated by the numeral 30, the lighter division lines by the numeral 31 and the concentric circles by the numeral 32.

The space inclosed between two adjacent lines 30 is the same as the opening 19 in the box or casing 17 and all the divisions formed by the lines 30 and 31 between two lines 30 are visible at once through the opening 19 when the disk 26 is properly positioned.

If it be assumed that the units designated by the numbers within the zone 27 be yards, then the units within the spaces found between the heavy lines 30 will represent prices for the numbers of yards indicated in the zone 27. For instance in the specific example shown in the drawing the numbers in the space to the left of a number indicated in the zone 27 and included between the two lines 30, indicate prices per unit for the number of units shown in the zone 27 and individual to the particular space referred to.

Let it be assumed for illustration that the capacity of the disk 26 is limited to ten yards and in the space of the zone 29 between two lines 30 to the left of each digit in the zone 27 are numbers indicating prices, these prices being displayed in regular series in any desired order, but the same order being observed in the several spaces included between the lines 30. Suppose a series of prices be indicated in the zone 29 to the left of the figure 1 in the zone 27. To the left of the numeral 2 in the zone 27 the numbers between the corresponding lines 30 in the zone 29 will show double the prices indicated in relation to the number 1 of the zone 27, and so on throughout the area of the zone 29.

On the face of the casing or box 17 are two pointers 33, 34, each having an index end 35 and at the other end provided with a manipulating knob 36 while extending longitudinally of each pointer is a slot 37 through which may be passed a thumb screw 38 entering the cover of the casing 17, the thumb screw being surrounded by a spring 39 tending to hold the pointer in adjusted position, but permitting movement of the pointer to any desired position by a suitable force applied to the knob 36. The range of movement of each pointer is sufficient to carry the indicating end 35 to any part of the opening 19.

The disk 26 is mounted on the shaft 20 in a manner to be rotated independently of said shaft on the application of a suitable force but built to normally rotate with said shaft. For this purpose the disk 26 may be provided with a spring sleeve 40 adapted to embrace the outer end of the shaft 20 and the other side of the disk 26 may be provided with a manipulating knob 41 projecting through the opening 18, or at least accessible to the operator.

To measure off a piece of cloth, the end of the cloth is carried over the roller 2 after being carried under the bar 5 and thence is carried to the slot or groove 8. Now the disk 26 is moved so that the number 10 corresponding to zero in the particular showing of the drawings is coincident with the pointer 28 and one or the other of the pointers 33 or 34, say the pointer 34 is placed so that its indicating end 35 is at the price per yard on the portion of the disk 26 visible through the opening 19. The cloth is now carried to the reel on the shaft 9 and made fast to the hooks 14, this movement having caused a turning of the roller 2 and a corresponding movement of the disk 26. Now the crank 15 is turned winding the cloth on the reel until the disk 26, which is supposed to be moving counter-clock-wise, has been moved a sufficient distance to bring the number in the zone 27 representing the desired number of yards into coincidence with the pointer 28, and then the end 35 of the pointer 34 will over-ride a number on the disk 26 representing the price of the chosen number of yards at the price per unit to which the pointer originally indicated, all those numbers in the same annular space between the lines 32 indicating multiples of the same unit prices. Now the cloth is severed from the main body of the cloth at the bar 7 and the winding of the cloth on the reel of the shaft 9 may be continued until the cloth is fully wound thereon after which the bar 12 may be loosened so as to loosen up the roll of cloth on the reel and the bearing 16 may be also loosened and the rolled up cloth on the reel may be removed therefrom.

Since it is not uncommon to sell goods by the quarter, half and three-quarter yard lengths in addition to the integer number, the lines 31 are so arranged with relation to the lines 30 as to indicate such fractional portions of the yard while in each space there may be provided numbers characteristically different from the main numbers, as for instance printed in a differently colored ink, indicating the prices per whole yard plus an additional quarter, half or three-quarter yard.

In order to explain more clearly the computation when fractional parts of a yard are involved, let it be supposed that the pointer 28 is coincident with the numeral 1 in the zone 27, as shown in Fig. 2. Under such circumstances, the line denoted by the character 30ª in Fig. 4 will be coincident with that edge of the opening 19 to which the character S is applied in Fig. 2. In such case, the radial line of numbers included between the lines 30ª and 31ª, will be the units of value. Suppose, further, that it is desired to ascertain the price of one and one-quarter yards of material at four and one-half cents per yard. In such instance, one of the pointers, say the pointer 34, is moved until its extremity lies over the character four and one-half, between the lines 30ª and 31ª. The disk 26 may then be rotated until the line 31ᵇ coincides with the pointer 28, whereupon the line 31ª will be in alinement with the edge S of the opening 19 in the case, the extremity of the pointer 34 registering in the space to which the character X is applied in Fig. 4, and indicating that the price of one and one-quarter yards of material at four and one-half cents per yard, is five and one-half cents. For instance, suppose the sale was five yards at eight cents per yard, then the pointer 34 is placed at the number 8 when the disk 26 is so positioned that the pointer 28 is over the number 1 in the zone 27. Now the cloth is wound on the reel carried by the shaft 9 until the number 5 in the zone 27 is brought under the pointer 28 when the pointing end 35 of the pointer 34 will over-ride the number 40 then visible through the opening 19. Suppose however that the customer had desired five and one-half yards, then the cloth is further wound on the reel until the pointer 28 is brought to the intermediate line between 5 and 6 of the zone 27. Now the pointer 34 will indicate the number 44 in a different form of display either by colored ink of different type or otherwise showing that the number represents a whole number of yards plus a fraction.

Suppose again that it is desirable to measure an amount of cloth exceeding the numbers displayed in the zone 27, then the other pointer, say the pointer 33 is brought into service, the same being true when a price is desired greater than any price included in the zone 29. For instance say the highest price indicated was 30 cents but it is desirable to find the price of a certain number of yards at 35 cents, then one pointer is placed at 30 and the other pointer at 5, or one pointer at 20 and the other pointer at 15, then by adding the prices indicated by the two pointers, the product of the number of yards, multiplied by thirty-five, will be obtained.

The measuring side of the device may be used separately from the cloth winding structure for indicating prices of any desired number of units at some chosen price per unit in the same manner as when the measuring device is used in connection with the cloth winding device.

What is claimed is:—

1. In a measuring and computing device, a rotatable member having displayed thereon numbers representing quantities and other numbers representing prices, a fixed pointer for the numbers representing quantities, and another pointer for the numbers representing prices movable rotatably and longitudinally into operative relation to any one of such numbers at will.

2. In a measuring and computing device, a rotatable member having displayed thereon numbers representing quantities and other numbers representing prices, a fixed pointer for the numbers representing quantities, and a plurality of other spring held pointers for the numbers representing prices each movable rotatably and longitudinally into operative relation to any one of such numbers at will.

3. In a measuring and computing device, a rotatable member having displayed thereon numbers representing quantities and other numbers representing prices, a fixed pointer for the numbers representing quantities, and another pointer for the numbers representing prices, said last named pointer being slotted longitudinally and provided with a pivot support with relation to which the pointer is movable both longitudinally of the pointer and rotatively with relation to the pivot.

4. In a measuring and computing device, a suitable casing provided with a circular opening and with a sectorial opening leading therefrom in radial relation thereto, a rotatable member within the casing having a series of numbers displayed thereon and visible through the circular opening and through the sectorial opening, a pointer in fixed relational to the casing and in operative relation to the numbers displayed through the circular opening, and another pointer carried by the casing in operative relation to the sectorial opening and movable at will into operative relation to any of the numbers visible through the sectorial opening.

5. In a measuring and computing instrument, a suitable casing provided with a circular opening and another opening leading therefrom in radial relation thereto, a rotatable disk within the casing having a series of numbers visible through the circular opening and other series of numbers visible in predetermined groups through the opening leading from the circular opening on the rotative movement of the disk, a pointer carried by the casing in operative relation to the numbers visible through the circular opening, and another pointer carried by the casing and movable rotatably and longitudinally into operative relation to any part of the opening leading from said circular opening.

6. In a measuring and computing instrument, a suitable casing provided with a circular opening and another opening leading therefrom in radial relation thereto, a rotatable disk within the casing having a series of numbers visible through the circular opening and other series of numbers visible in predetermined groups through the opening leading from the circular opening on the rotative movement of the disk, a pointer carried by the casing in operative relation to the numbers visible through the circular opening, another pointer carried by the casing and movable rotatably and longitudinally into operative relation to any part of the opening leading from said circular opening, and another pointer on the casing also movable into operative relation to any part of the opening leading from the circular opening.

In testimony that I claim the foregoing as my own, I have hereto affixed my signature in the presence of two witnesses.

EUGENE A. LUSTER.

Witnesses:
J. G. LAMBERT,
J. C. CHANDLER.

---

Copies of this patent may be obtained for five cents each, by addressing the "Commissioner of Patents, Washington, D. C."